(12) United States Patent
Goldmaier

(10) Patent No.: US 9,701,550 B2
(45) Date of Patent: Jul. 11, 2017

(54) DEVICE FOR DISINFECTING WATER BY MEANS OF ANODIC OXIDATION

(75) Inventor: Martin Alexander Goldmaier, Kassel (DE)

(73) Assignee: AUTARCON GmbH, Kassel (DE)

( * ) Notice: Subject to any disclaimer, the term of this patent is extended or adjusted under 35 U.S.C. 154(b) by 1115 days.

(21) Appl. No.: 13/496,926

(22) PCT Filed: Sep. 18, 2009

(86) PCT No.: PCT/DE2009/001313
§ 371 (c)(1),
(2), (4) Date: Mar. 19, 2012

(87) PCT Pub. No.: WO2011/032527
PCT Pub. Date: Mar. 24, 2011

(65) Prior Publication Data
US 2012/0175271 A1    Jul. 12, 2012

(51) Int. Cl.
| | |
|---|---|
| C25B 9/00 | (2006.01) |
| C02F 1/461 | (2006.01) |
| C02F 1/467 | (2006.01) |
| C02F 1/00 | (2006.01) |

(52) U.S. Cl.
CPC ......... *C02F 1/4674* (2013.01); *C02F 1/006* (2013.01); *C02F 1/4618* (2013.01); *C02F 2201/008* (2013.01); *C02F 2201/009* (2013.01); *C02F 2201/4617* (2013.01); *C02F 2201/46125* (2013.01); *C02F 2201/46135* (2013.01); *C02F 2201/46145* (2013.01); *C02F 2201/46165* (2013.01); *C02F 2209/003* (2013.01); *C02F 2209/04* (2013.01); *C02F 2209/05* (2013.01); *C02F 2209/40* (2013.01); *C02F 2209/42* (2013.01)

(58) Field of Classification Search
CPC ....... C02F 1/467; C02F 1/4672; C02F 1/4674
See application file for complete search history.

(56) References Cited

U.S. PATENT DOCUMENTS

| | | | | |
|---|---|---|---|---|
| 4,724,059 | A * | 2/1988 | Collier | 204/228.2 |
| 4,767,511 | A * | 8/1988 | Aragon | 210/743 |
| 5,422,014 | A * | 6/1995 | Allen et al. | 210/743 |
| 5,756,051 | A * | 5/1998 | Overton et al. | 422/108 |
| 6,780,306 | B2 * | 8/2004 | Schlager et al. | 205/701 |
| 7,552,877 | B2 * | 6/2009 | Grant | 239/222.15 |
| 8,323,474 | B2 * | 12/2012 | Jeon et al. | 205/743 |
| 2002/0033332 | A1* | 3/2002 | Handa | 204/230.2 |
| 2002/0070107 | A1 | 6/2002 | Usinowicz et al. | |

(Continued)

FOREIGN PATENT DOCUMENTS

| | | |
|---|---|---|
| DE | 2935124 | 3/1981 |
| DE | 29709241 | 8/1997 |

*Primary Examiner* — Keith Hendricks
*Assistant Examiner* — Salil Jain
(74) *Attorney, Agent, or Firm* — Dilworth & Barrese, LLP

(57) ABSTRACT

A device for the purification of water, has the following components: (a) a storage tank (10) for retention of the purified water; (b) a feed pipe (15), leading from the water to be purified to the storage tank (10); (c) a reactor (4) for anodic oxidation of the water arranged within the feed pipe (15); (d) the storage tank (10) having a redox sensor (5) for measuring the redox potential; and (e) water supply from the feed pipe (15) into the storage tank (10) is performed discontinuously.

12 Claims, 2 Drawing Sheets

(56) References Cited

U.S. PATENT DOCUMENTS

| | | |
|---|---|---|
| 2003/0029808 A1* | 2/2003 | Yamamoto et al. .......... 210/748 |
| 2003/0164308 A1* | 9/2003 | Schlager et al. .............. 205/701 |
| 2004/0149663 A1* | 8/2004 | Nakanishi et al. .......... 210/748 |
| 2006/0283808 A1 | 12/2006 | Kadlec et al. |
| 2007/0108064 A1* | 5/2007 | Buckley et al. .............. 205/620 |
| 2009/0242419 A1* | 10/2009 | Aldridge et al. ............. 205/335 |
| 2012/0152760 A1* | 6/2012 | Robinson ..................... 205/742 |

* cited by examiner

DEVICE FOR DISINFECTING WATER BY MEANS OF ANODIC OXIDATION

FIELD OF INVENTION

The invention relates to a device for the purification of water by anodic oxidation.

STATE OF THE ART

Anodic oxidation is performed by what is commonly known as electrolytic cell, which is embodied as a set of plate electrodes. Such electrolytic cell is commercially available, for example, from the company G.E.R.U.S. The production of free chlorine from NaCl dissolved in water is performed by such anodic oxidation reactor in the form of an electrolytic cell, in the process of which hypochloric acid is formed which disinfects the water. So far, the technology is known and does not need to be explained in more detail at this point.

Furthermore, there is known what is referred to as a redox sensor. By means of a redox sensor the redox potential is determined, which is a voltage, on the basis of which it is possible to make statements on the water quality with respect to its bacterial contamination depending on the amount of measured voltage. It is not possible, however, to make a direct statement on the chlorine content of the water depending on the measured voltage, as the voltage is also influenced by both the pH value and the temperature of the water. However, it is possible to make assumptions about when a certain voltage shows a good or a bad water quality on the basis of information found in tables. This means that the redox potential allows a statement on the disinfection potential of the water. Said redox potential is a very weak signal and thus prone to interference.

As already explained elsewhere, the purification of water by anodic oxidation is already known. In this context a device for the purification of water comprising two water circuits is known. In one of the water circuits, the chlorination of the water by anodic oxidation takes place, whereby in another water circuit, which is essentially separated from the first one, the chlorinated water is channeled into a storage tank. Consequently, the redox sensor is not connected to the reactor for anodic oxidation by any means. The amount of necessary pipe material for a device according to the state of the art is considerable. Devices for the purification of water are needed particularly in developing countries, therefore it is always intended to manufacture such devices for the purification of water as cost-effectively as possible and, in addition, to embody them as robustly as possible. Due to the fact that the state of the art provides two water circuits, the device is, on the one hand, more prone to interference, and more expensive on the other.

The task underlying the present invention is, therefore, to provide a device for the purification of water by anodic oxidation, which can be manufactured at a considerably lower cost and more simply than in the state of the art by embodying the device with one single water circuit only. This means that the device is intended to work with one single water circuit only, which comprises both the reactor for the anodic reaction as well as the redox sensor.

DESCRIPTION OF THE INVENTION

In a first embodiment the invention refers to a device for the purification of water, comprising the following components:
(a) A storage tank (10) for retention of the purified water;
(b) A feed pipe (15), leading from the water to be purified to the storage tank (10);
(c) Wherein a reactor (4) for anodic oxidation of the water is arranged within the feed pipe (15), and
(d) The storage tank (10) comprises a redox sensor (5) for measuring the redox potential, and
(e) Water supply from the feed pipe (15) into the storage tank (10) is performed discontinuously.

A device of the kind described above, which works with one single water circuit but which is still capable of providing purified drinking water in a sufficient quality and quantity, is characterized by the features herein. In this process, a storage tank for purified water is provided having a feed pipe leading from the water to be purified into the storage tank, whereby a reactor for the anodic reaction of the water is arranged within the feed pipe. A redox sensor is arranged within the storage tank itself, which can be purchased, for example, from the company Jumo. By means of said redox sensor, the redox potential is measured which is a value indicating the water quality.

As already described elsewhere, the redox potential is a very weak signal and thus also prone to interference. As the redox sensor is electrically connected to the reactor both by means of the feed pipe and the water entering the storage tank, the voltage applied to the reactor falsifies the measuring signal of the redox sensor such that it is not suitable to function as a value with respect to a statement on water quality. In so far, according to the invention it is provided that the water supply from the feed pipe into the storage tank is embodied in a discontinuous form so that no electric connection exists between the redox sensor on the one hand, which is situated within the storage tank, and the reactor carrying out the anodic oxidation on the other, which means that no electric connection exists between the control circuit and the load circuit. The control circuit comprises the sensors, in particular, the redox sensor; the load circuit comprises the oxidation reactor.

In order to supply water in a discontinuous manner into the storage tank, in particular, an arrangement is provided, which may, for example, be embodied as a tube, wherein the tube comprises a number of openings through which the water is discharged into the storage tank in the form of a discontinuous water jet or in the form of drops. In this context it is also conceivable that the arrangement is embodied as a disk interrupting the water jet or as a finger which rotates below the water jet at a respective velocity.

According to another feature of the invention, the device comprises a control, wherein the voltage applied to the reactor is controlled by said control depending on the magnitude of the redox potential. More precisely, said control is connected to a pump within the feed pipe. This means that the voltage applied to the reactor is controlled in relation to the amount of water which is supplied through the pump, depending on the measured redox potential, the conductance of the water, and the bacterial contamination. At least one level sensor is arranged within the storage tank in order to prevent the storage tank from flowing over or a particular amount of water to be stored from falling below a certain value.

In addition, the feed pipe comprises a flow meter which is also connected to the control.

BRIEF DESCRIPTION OF THE DRAWINGS

The figures below describe the invention in more detail.

DESCRIPTION OF THE PREFERRED EMBODIMENTS

Figure 1:
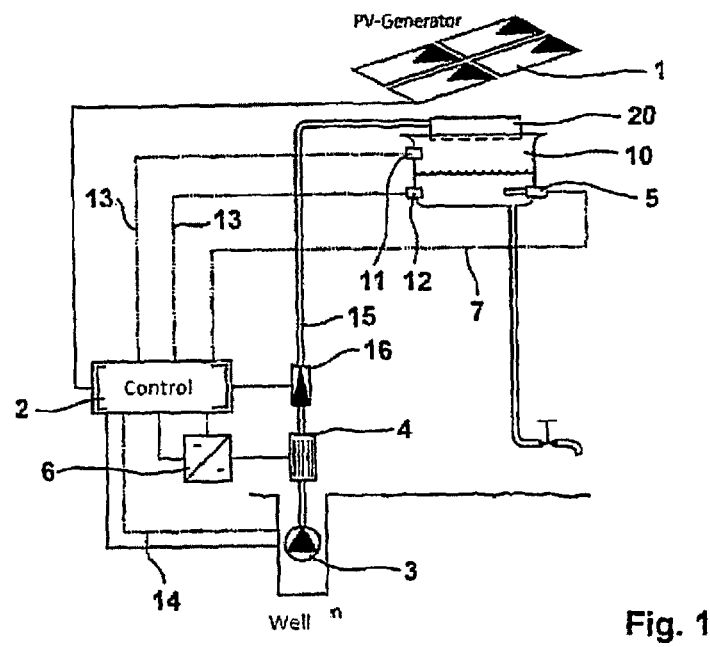
FIG. 1 shows an illustration of the device for the purification of water.

The invention relates to a device for the purification of water, whereby such device shall particularly be applied in developing countries. It may be used there as transportable equipment for the purification of drinking water. The device is provided with a power supply, preferably, a photovoltaic generator (1), which supplies both the pump (3) and the anodic oxidation reactor (4) with electric current by means of a control (2). A DC/DC converter (6) is arranged between the anodic oxidation reactor and the control. The redox sensor (5) is connected to the control (2) by means of a measuring line (7). The two level sensors (11) and (12) arranged within the storage tank (10) are connected to the control by further measuring lines (13), wherein the control is connected to the pump by a line (14).

Figure 1A:
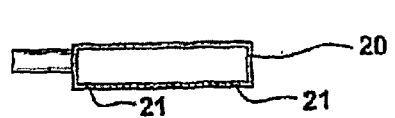
FIG. 1a shows the arrangement for the generation of a discontinuous water jet.
Figure 1B:
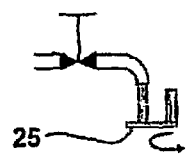
FIG. 1b schematically shows a rotating finger for interruption of the water jet.

The feed pipe marked (15), within which also the flow meter (16) is arranged, constitutes the connection between the pump (3), the anodic oxidation reactor (4), the flow meter (16) and the storage tank (10). As already explained, the redox sensor (5) is arranged within the storage tank (10), measuring the redox potential as a voltage there. The measured value itself, i.e. the redox potential, is very weak so that interferences directly lead to a falsification of the measured value such that said value is not suitable any more for providing a statement with respect to the water quality. In this context it is provided that the feed pipe (15) comprises an arrangement (20) for discontinuous water supply at its end above the storage tank (10). Such device for discontinuous water supply may be embodied according to FIG. 1a as a tube section or as a cylinder, comprising a number of openings (21) in order to allow the discharge of the water into the storage tank (10) in the form of droplets or, at least, in a discontinuous form. According to FIG. 1b, a rotating finger (25) below a water outlet is provided, which continuously interrupts the jet of water. If a continuous jet of water were able to enter storage tank (10) from the feed pipe (15), an electric connection between the redox sensor within the storage tank and the anodic oxidation reactor would exist through the water jet. This would mean that interferences caused within the oxidation reactor by the voltage and the electric current would be transferred by the water to the redox sensor within the storage tank. By means of unbundling the water jet into partial jets, or by a continuous short-term interruption of the jet, which means a discontinuous supply of water into the storage tank, there is no direct connection between the redox sensor, on the one hand, and the oxidation reactor on the other. Any interferences at the redox sensor can therefore be completely eliminated, which, in particular, does not necessitate any additional cost with respect to a possible use of particular circuits which are intended to prevent such interferences.

Figure 2:
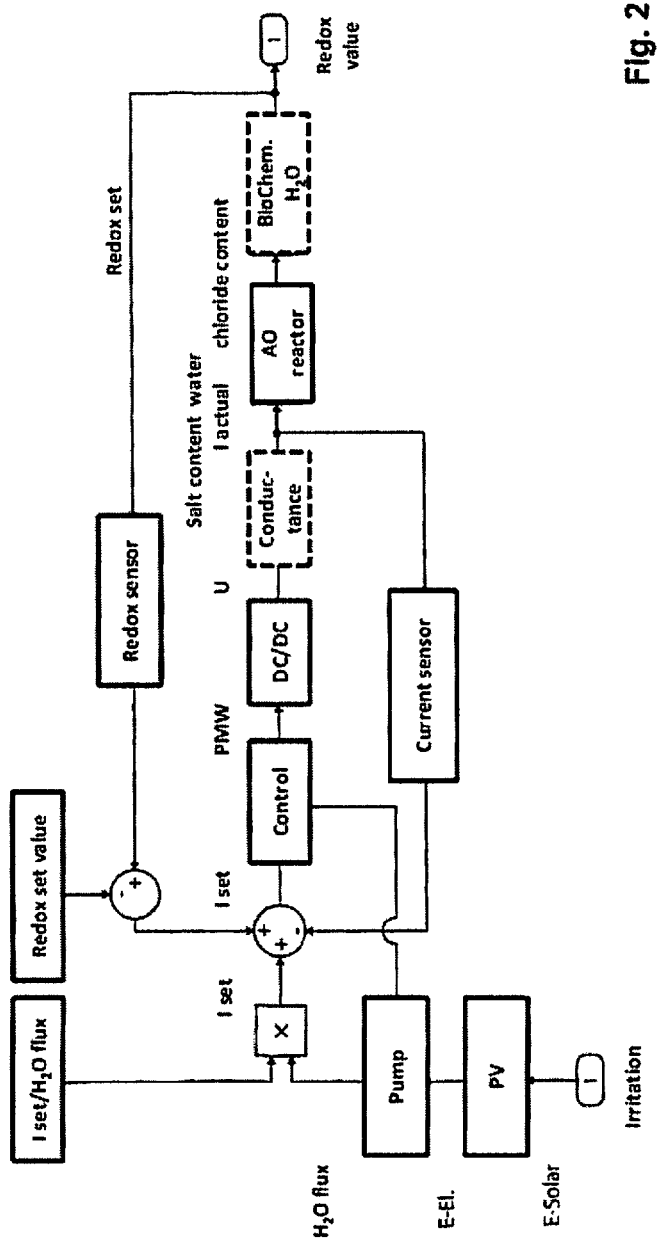
FIG. 2 shows the control.

The control shown in FIG. 2 acts as follows:

If the solar radiation directed at the photovoltaic generator is large enough, and if there is sufficient water for purification purposes available, and if the storage tank (10) is not full, the control will switch on both the DC/DC converter (6) and the pump. Depending on the water flow, a current target value ($I_{soii}$) is indicated by the anodic oxidation reactor. Thereby the control generates a respective PWM signal, as a consequence of which a voltage generated by the DC/DC converter is applied to the plates of the anodic oxidation reactor and a current depending on the conductance of the water $I_{ist}$ appears. Due to the current within the anodic oxidation reactor, free chlorine is formed, which reacts with the substances present in the water (bacteria, dust, etc.) and which is measured by means of the redox potential. Said current is compared to the specified redox target value and amplifies or reduces the specified current target value ($I_{set}$). By means of a current sensor the current ($I_{actual}$) is constantly compared to the current target value ($I_{set}$) and adapted, if necessary. The control interprets the effect of the bacteria on the system as interference. No direct measured data exist on its influence; however, its value is reflected in the redox potential. If the number of bacteria colonies is large, a larger amount of oxidizing substances is required, or, respectively, used, which results in a reduction of the redox voltage. An effective entry of bacteria can be assumed with a time constant of several hours. Therefore, the redox potential is the true control variable of the system.

In a second embodiment the invention refers to a process for the purification of water, whereby the water to be purified is supplied discontinuously by a feed pipe, in which the water is subject to anodic oxidation by means of a reactor arranged within said feed pipe, subsequently the water is lead into a storage tank, wherein the redox potential as a standard for water quality is determined by means of a redox sensor arranged within said storage tank.

The anodic oxidation is performed by means of an electrolytic cell, while the electric components are operated by means of a photovoltaic generator. The control circuit (redox sensor) is separated electrically from the load circuit (oxidation reactor). The voltage applied to the reactor is controlled depending on the redox potential. At least one level sensor prevents the water in the storage tank from exceeding or falling below a specified amount. The purification is performed using one single water circuit.

The invention claimed is:

1. Device for purification of water, comprising the following components:
    (a) a storage tank (10) for retention of purified water;
    (b) a feed pipe (15), leading the purified water to the storage tank (10);
    (c) a reactor (4) for anodic oxidation of the water and placed within the feed pipe (15),
    (d) the storage tank (10) comprising a redox sensor (5) for measuring the redox potential,
    (e) an arrangement (20) positioned in the feed pipe (15) for the discontinuous, interrupted water supply into the storage tank (10) at discharge from the arrangement (20), such that water is discontinuously supplied from the feed pipe (15) into the storage tank (10) with a supply stream of water being interrupted,
    (f) a control (2) configured for controlling voltage applied to the reactor (4) depending on the magnitude of the redox potential of the purified water, and
    (g) a measuring line (7) connecting the redox sensor (5) to the control (2), wherein
    the redox sensor (5) is separated electrically from the oxidation reactor (4) for avoiding falsification of the redox signal caused by the voltage applied to the oxidation reactor (4),
    the arrangement (20) comprises a tube having a multitude of openings (21), and
    the redox sensor (5) and the reactor (4) are arranged with a lack of direct electrical connection therebetween.

2. Device according to claim 1, wherein the control (2) is connected to a pump (3) arranged within the feed pipe (15).

3. Device according to claim 1, wherein the control (2) is connected to at least one level sensor (11, 12) within the storage tank (10).

4. Device according to claim 1, wherein the feed pipe (15) comprises a flow meter (16), which is connected to the control (2).

5. Device according to claim 1, additionally comprising level sensors (11, 12) positioned within the storage tank (10), measuring lines (13, 13) interconnecting the level sensors (11, 12) and the control (2), a pump (3) arranged within the feed pipe (15), and a line (14) interconnecting the pump (3) and the control (2).

6. Device according to claim 5, additionally comprising a photovoltaic generator power supply (1) coupled to the control (2), a DC/DC converter (6) coupled between the control (2) and the reactor (4), and a flow meter (16) arranged within the feed pipe (15) downstream of the reactor (4) and connected to the control (2).

7. Device for purification of water, comprising the following components:
   (a) a storage tank (10) for retention of purified water;
   (b) a feed pipe (15), leading the purified water to the storage tank (10);
   (c) a reactor (4) for anodic oxidation of the water and placed within the feed pipe (15),
   (d) the storage tank (10) comprising a redox sensor (5) for measuring the redox potential,
   (e) an arrangement (20) positioned in the feed pipe (15) for the discontinuous, interrupted water supply into the storage tank (10) at discharge from the arrangement (20), such that water is discontinuously supplied from the feed pipe (15) into the storage tank (10) with a supply stream of water being interrupted,
   (f) a control (2) configured for controlling voltage applied to the reactor (4) depending on the magnitude of the redox potential of the purified water, and
   (g) a measuring line (7) connecting the redox sensor (5) to the control (2), wherein the redox sensor (5) is separated electrically from the oxidation reactor (4) for avoiding falsification of the redox signal caused by the voltage applied to the oxidation reactor (4), the arrangement (20) comprises a rotating finger (25) continuously interrupting a water jet, and being arranged to interrupt water supply into the storage tank (10), and the redox sensor (5) and the reactor (4) are arranged with a lack of direct electrical connection therebetween.

8. Device according to claim 7, wherein the control (2) is connected to a pump (3) arranged within the feed pipe (15).

9. Device according to claim 7, wherein the control (2) is connected to at least one level sensor (11, 12) within the storage tank (10).

10. Device according to claim 7, wherein the feed pipe (15) comprises a flow meter (16), which is connected to the control (2).

11. Device according to claim 7, additionally comprising level sensors (11, 12) positioned within the storage tank (10), measuring lines (13, 13) interconnecting the level sensors (11, 12) and the control (2), a pump (3) arranged within the feed pipe (15), and a line (14) interconnecting the pump (3) and the control (2).

12. Device according to claim 11, additionally comprising a photovoltaic generator power supply (1) coupled to the control (2), a DC/DC converter (6) coupled between the control (2) and the reactor (4), and a flow meter (16) arranged within the feed pipe (15) downstream of the reactor (4) and connected to the control (2).

* * * * *